United States Patent
Voit et al.

(10) Patent No.: US 11,084,964 B2
(45) Date of Patent: *Aug. 10, 2021

(54) RECYCLE PROCESSES WITH SUPERCRITICAL SILOXANES

(71) Applicant: WACKER CHEMIE AG, Munich (DE)

(72) Inventors: Harald Voit, Reischach (DE); Steffen Dörrich, Munich (DE); Martin Petri, Emmerting (DE); Erich Schaffer, Duttendorf (AT); Richard Weidner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 85 days.

This patent is subject to a terminal disclaimer.

(21) Appl. No.: 16/343,317

(22) PCT Filed: Aug. 11, 2017

(86) PCT No.: PCT/EP2017/070499
§ 371 (c)(1),
(2) Date: Apr. 18, 2019

(87) PCT Pub. No.: WO2019/029829
PCT Pub. Date: Feb. 14, 2019

(65) Prior Publication Data
US 2020/0181470 A1    Jun. 11, 2020

(51) Int. Cl.
*C09K 5/10* (2006.01)
*C07F 7/08* (2006.01)
*F01K 25/08* (2006.01)
*F22B 1/00* (2006.01)

(52) U.S. Cl.
CPC .............. *C09K 5/10* (2013.01); *C07F 7/0838* (2013.01); *F01K 25/08* (2013.01); *F22B 1/006* (2013.01)

(58) Field of Classification Search
CPC ......... C09K 5/10; C07F 7/0838; F01K 25/08; F01K 7/22; Y02P 20/54; F22B 1/006

USPC ............................................... 252/78.3, 78.1
See application file for complete search history.

(56) References Cited

U.S. PATENT DOCUMENTS

| | | | |
|---|---|---|---|
| 10,351,747 B2 * | 7/2019 | Doerrich | C09K 5/10 |
| 2015/0033737 A1 | 2/2015 | Mitri et al. | |
| 2015/0175868 A1 | 6/2015 | Hoffmann et al. | |
| 2018/0010027 A1 | 1/2018 | Doerrich et al. | |
| 2019/0178533 A1 * | 6/2019 | Voit | F24S 40/58 |

FOREIGN PATENT DOCUMENTS

| | | | | |
|---|---|---|---|---|
| DE | 19858712 A1 | 8/2000 | | |
| DE | 19907512 A1 | 8/2000 | | |
| DE | 10008123 A1 | 8/2001 | | |
| DE | 102007009503 B4 | 9/2008 | | |
| DE | 102011119977 A1 | 6/2013 | | |
| DE | 102012211258 A1 | 1/2014 | | |
| DE | 102015202158 A1 | 8/2016 | | |
| IN | 201647039170 | * | 1/2017 | ............... C01K 5/10 |
| WO | WO-2015177000 A1 | * | 11/2015 | ............... F24S 80/20 |

OTHER PUBLICATIONS

Krishnan Sahasranaman et al., "Get the Most From High-temperature Heat-transfer-fluid Systems", Chemical Engineering, 112,3 (Mar. 2005), 46-50. (Year: 2005).*
Erich Schaffer et al: "Creating Tommow's Solutions Content", 19. Kölner Sonnenkolloquium, 2016.
English Abstract corresponding to DE10008123A.
English Abstract corresponding to DE19907512A1.
English Abstract corresponding to DE19858712A1.
English Abstract corresponding to DE 10 2007 009 503 A1.

* cited by examiner

*Primary Examiner* — Douglas J McGinty
(74) *Attorney, Agent, or Firm* — Brooks Kushman P.C.

(57) ABSTRACT

The invention provides circular processes using siloxanes as high-temperature heat transfer fluid (HTF), wherein the siloxanes go over from the state of the supercooled liquid into the state of the high-density supercritical fluid by means of heat uptake without a phase transition and energy is then transferred as energy without a phase transition.

6 Claims, 10 Drawing Sheets

Figure 1:
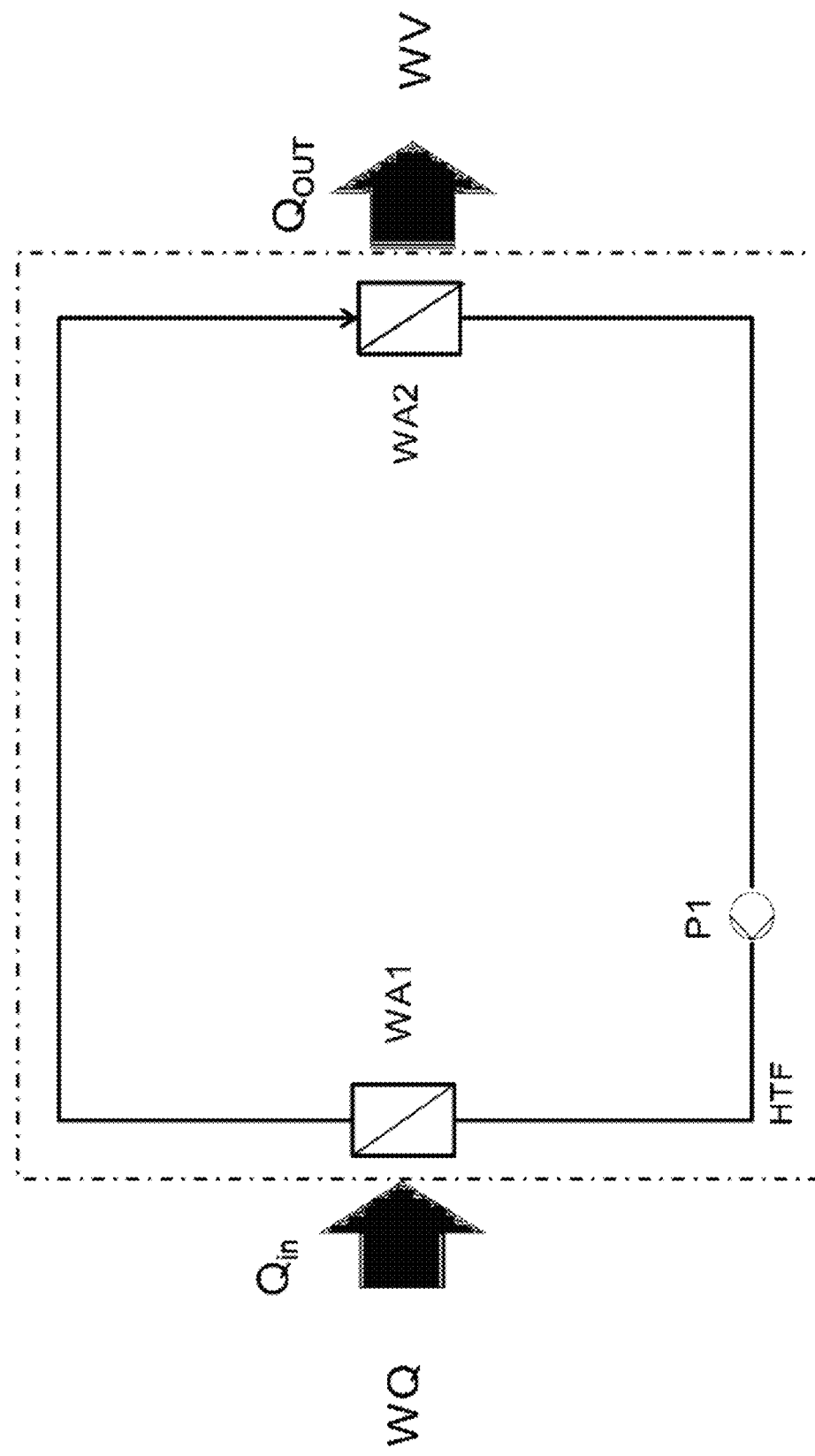

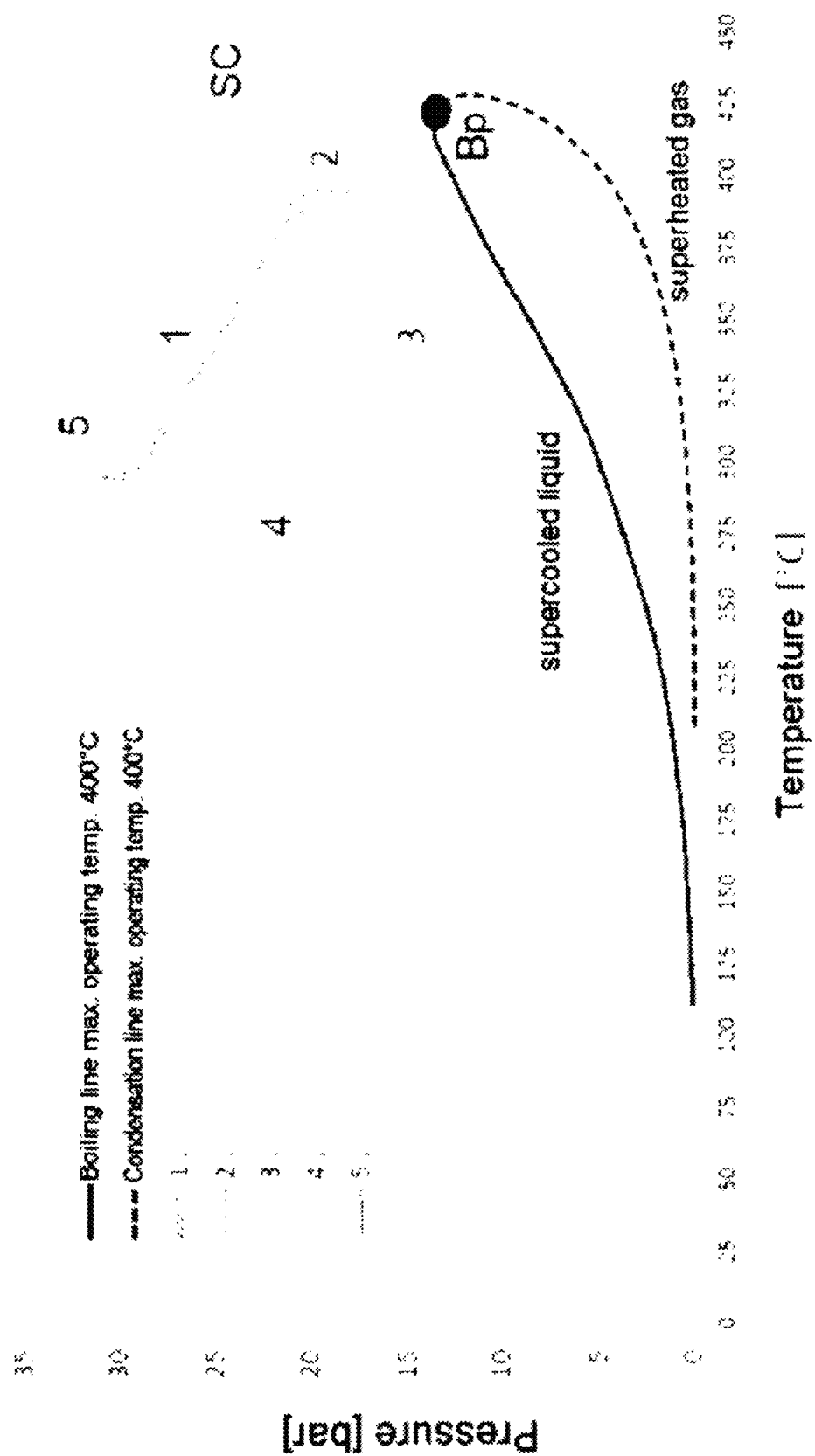
Fig. 3.1

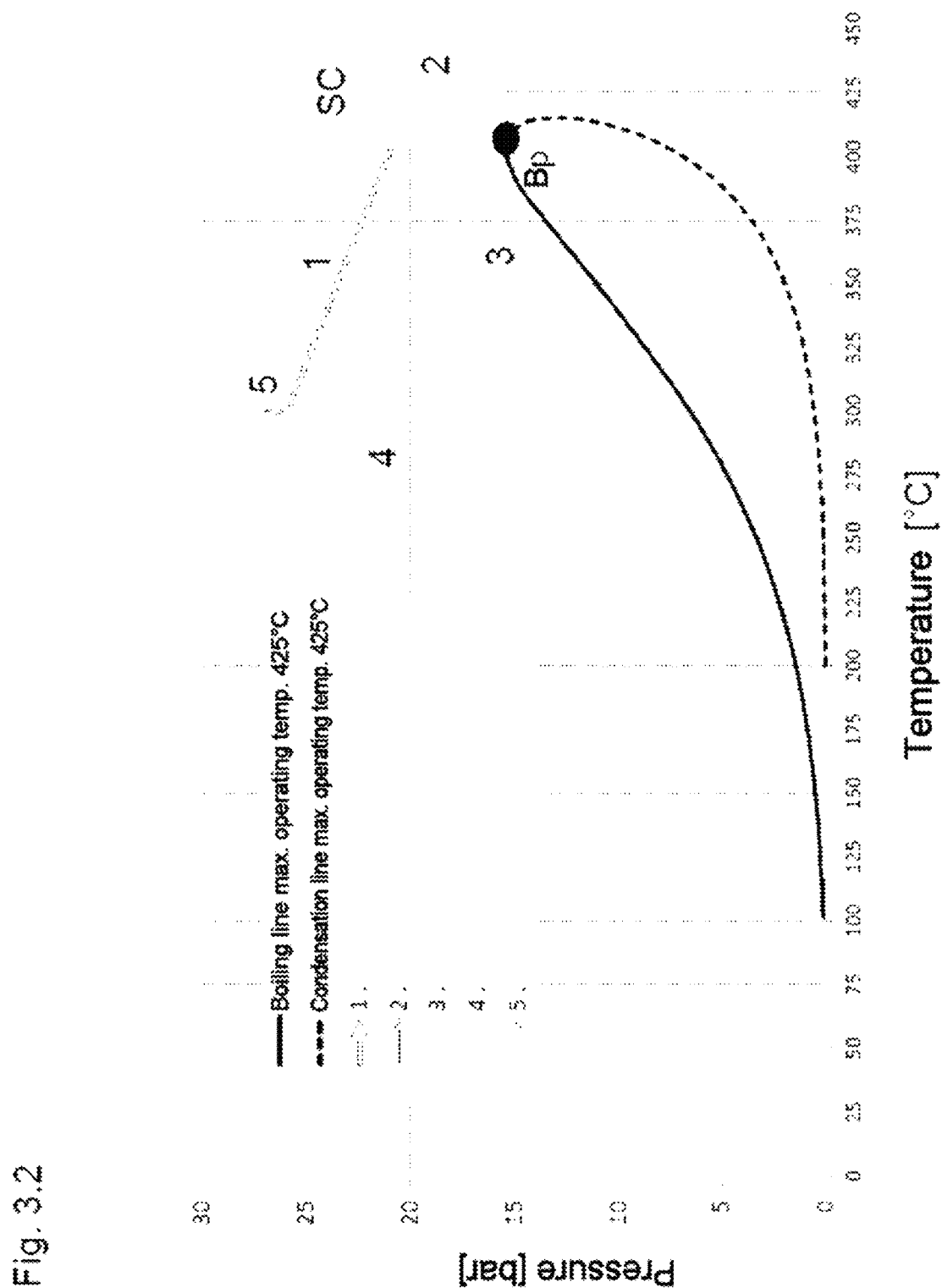
Fig. 3.2

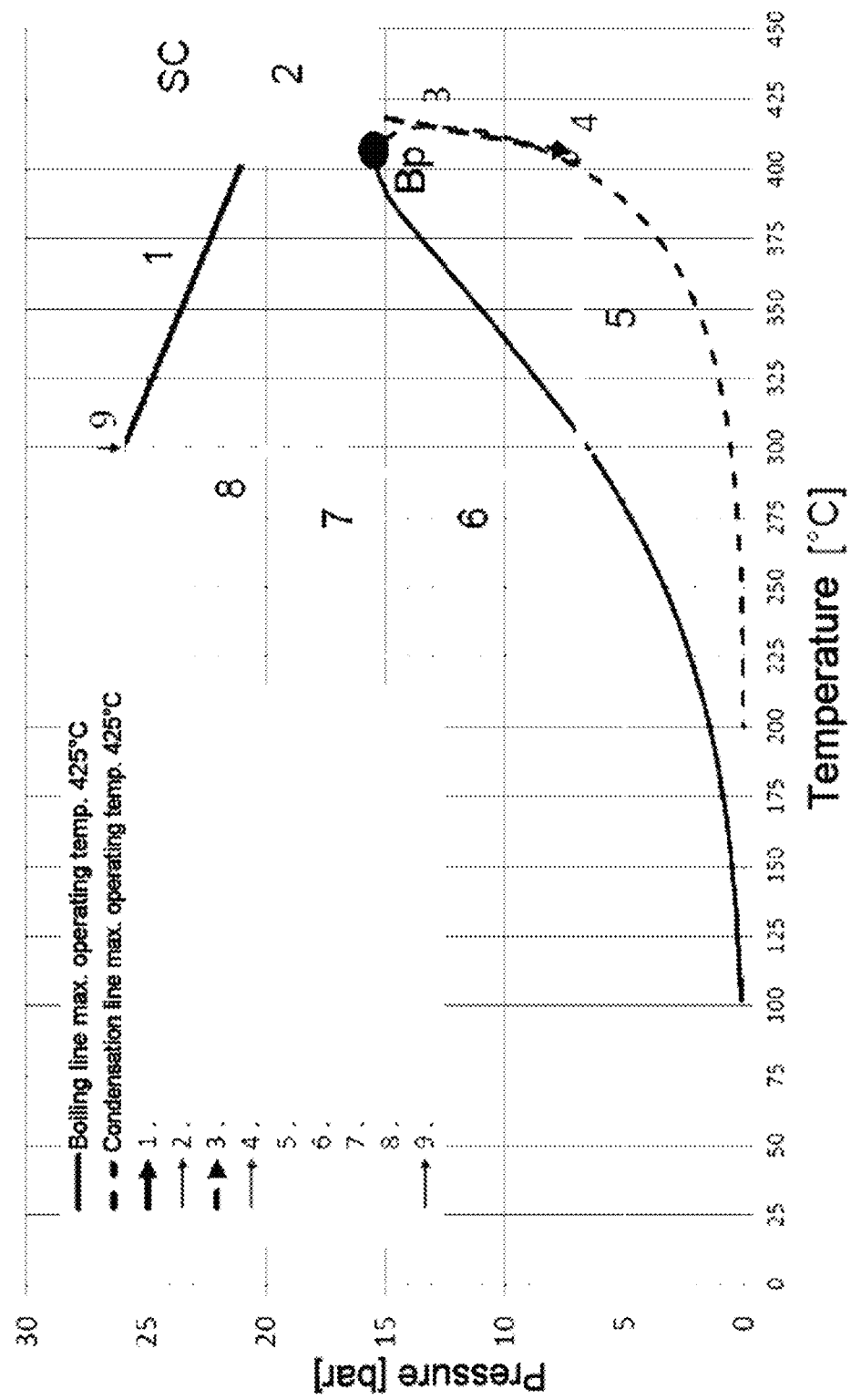
Fig. 3.3

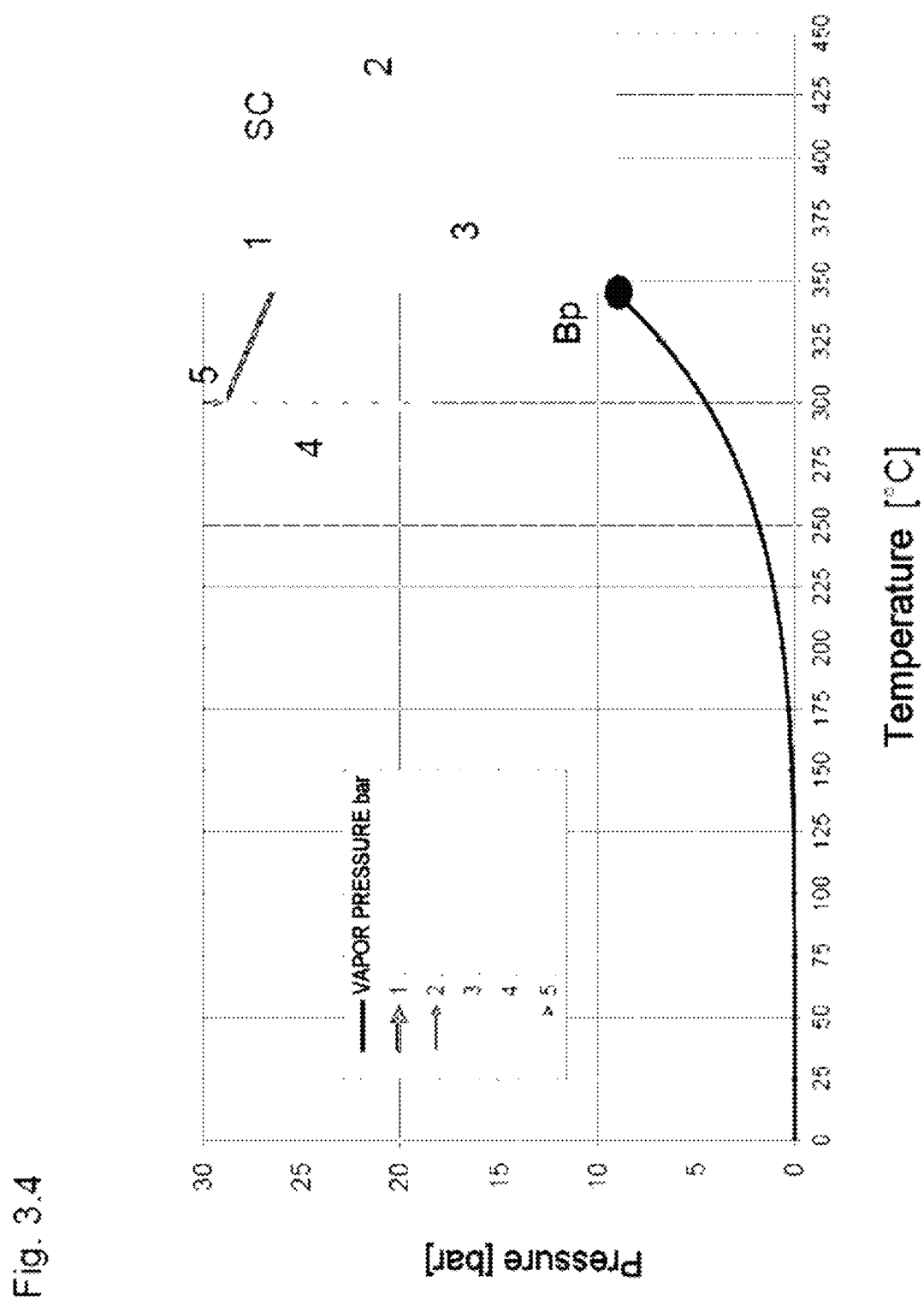
Fig. 3.4

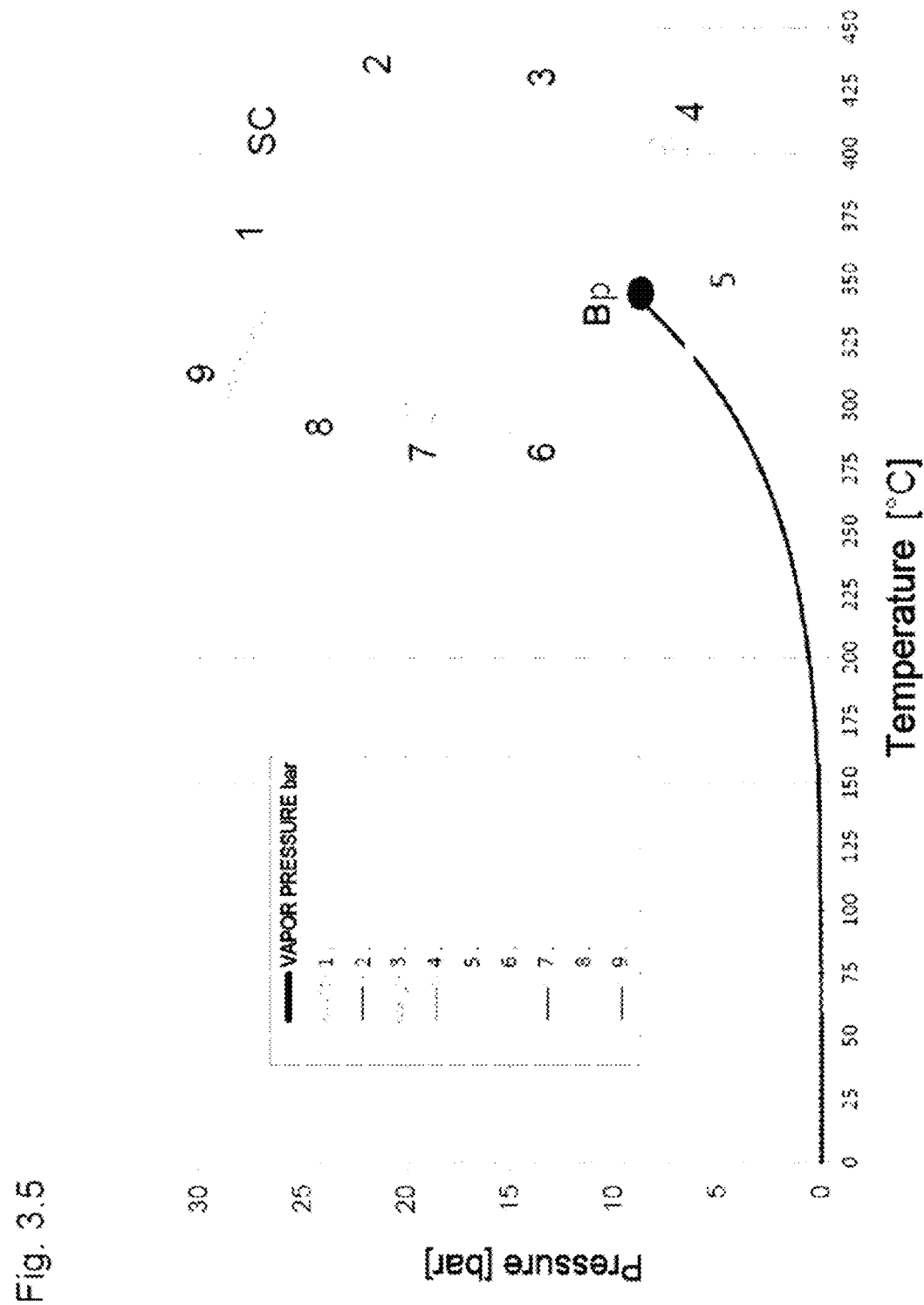
Fig. 3.5

RECYCLE PROCESSES WITH SUPERCRITICAL SILOXANES

CROSS-REFERENCE TO RELATED APPLICATIONS

This application is a U.S. National Phase Application of PCT/EP2017/070499, filed Aug. 11, 2017 the contents of which are incorporated herein by reference in its entirety for all purposes.

FIELD OF THE INVENTION

The invention relates to circular processes using supercritical siloxanes as high-temperature heat transfer fluid (HTF).

BACKGROUND OF THE INVENTION

In solar-thermal power stations, the radiation from the sun is concentrated (CSP=concentrated solar power), e.g. by means of parabolic mirrors, and transferred to a high-temperature heat transfer fluid (HTF). In a circular process, the HTF passes the heat which has been introduced to a heat consumer before it once again takes up heat in the solar field. The heat consumer is, according to the prior art, a thermal steam power station in which heat from the primary HTF circuit is transferred in a heat exchanger or an assembly of a plurality of heat exchangers to a secondary Clausius Rankine process. Here, water is firstly vaporized and superheated at high pressure. The superheated steam is then depressurized in a steam turbine or an assembly of a plurality of steam turbines and thus generates mechanical work. The depressurized steam is subsequently condensed and the condensate is compressed by means of a feed water pump to the high pressure at which heat can then be taken up again and superheated steam be produced.

Prior art in solar-thermal power stations is the use of incompressible high-temperature heat transfer fluids in the liquid state in the total temperature usage range with heat transfer to a secondary steam process and sole conversion of thermal energy into mechanical work in the secondary steam power process.

DE 198 58 712 A1 describes a process for converting thermal energy into mechanical work by means of a circular process, wherein the heat transfer medium is a polysiloxane present in the vapor phase or a polysiloxane mixture, the heat transfer medium present in the vapor phase is a cyclic polysiloxane or a cyclic polysiloxane mixture, and the polysiloxane is linear with predominantly n<5 and cyclic with n<6 and is used in pure form or as mixtures.

DE 100 08 123 A1 describes an apparatus for energy conversion based on thermal ORC circular processes, characterized in that the energy required for the ORC circular process is provided by means of one or more solar collectors, where an organic medium, preferably hexamethyldisiloxane, flows in the solar collector or collectors and the hexamethyldisiloxane has been subjected to heating and superheating in the circular process above the critical temperature in the range from 240 to <=500° C., preferably 400° C.

DE 199 07 512 A1 describes an apparatus for energy conversion on the basis of thermal ORC circular processes, comprising an at least two-stage cascaded arrangement in which the fluid of the high-temperature circuit is water and the fluid of the low-temperature circuit is an organic medium or siloxane.

DE 10 2007 009 503 B4 describes a process for ORC steam processes in which the gaseous ORC working fluid which has been preheated and vaporized by means of at least two heat sources having different temperatures is depressurized in at least two working stages.

BRIEF SUMMARY OF THE INVENTION

The invention provides circular processes using siloxanes as high-temperature heat transfer fluid (HTF), wherein the siloxanes go over from the state of the supercooled liquid into the state of the high-density supercritical fluid by means of heat uptake without a phase transition and energy is then preferably transferred as heat or work without a phase transition.

The circular processes are possible because siloxanes are still thermally stable in the state of the supercritical fluid. Siloxanes as HTF allow cycling of the HTF from the state of the supercooled liquid into the state of high-density supercritical fluid with uptake of heat. In the state of the supercritical fluid, a vapor pressure solely as a function of the temperature, as is normal in the case of heat transfer fluids according to the prior art, is nonexistent. The supercritical fluid obeys the laws of a real gas. The density of the HTF in the range of the supercritical fluid is a function of temperature and pressure, i.e. can be set by means of the applied pressure.

The functional relationship can be described by an equation of state (EOS). When the pressure is selected advantageously according to the invention, use of siloxanes as HTF up to into the supercritical state is possible without restriction.

The region of the supercooled liquid is the region above the boiling line, as can be seen in FIGS. 3.1 to 3.5.

When the pressure goes, at the same temperature, above the boiling line to a higher pressure, the liquid is supercooled because at this pressure it is necessary to go to the right to a higher temperature in order for the liquid to boil.

Previous heat transfer fluids are restricted to the use range<400° C. New advantageous heat transfer fluids, for example mixtures consisting of linear and cyclic siloxanes and silanes can, owing to their excellent thermal stability, also be used in the temperature range from 400° C. to 450° C., preferably up to 425° C.

Owing to the composition as mixture with siloxanes having up to 20 and more silicon atoms and the high critical temperatures of >425° C. even in the case of siloxanes having more than nine silicon atoms, has previously been assumed that mixtures of this type have a vapor pressure (boiling line) in the temperature range from 400 to 450° C. and behave approximately like an incompressible liquid when a pressure above the vapor pressure is applied.

Above the critical temperature, which in the case of heat transfer fluids composed of siloxanes is preferably in the range from 400 to 450° C., any desired pressure can be set without a phase transition. A vapor pressure as has previously been assumed is nonexistent here.

The heat transfer fluid is a real gas in the range above the critical temperature. The density is determined by pressure and temperature.

In the circular processes, siloxanes can, in solar power stations, be heated without a phase transition from the state of the supercooled liquid to the state of the supercritical fluid having a high density in the temperature range up to above 400° C., preferably up to 425° C., in receiver tubes in the solar fields at pressures above their critical pressure. A phase transition with a sharp great change in the materials properties from the state of a liquid to the state of a gas, as occurs in the two-phase region between boiling line and condensation line, does not occur. This would lead to uncontrollable instabilities in a solar field having a pipe network which is a number of kilometers long and many parallel loops.

In one embodiment, the siloxanes are cooled in the state of the supercritical fluid and in the process transfer heat to a heat consumer, e.g. a secondary circular process. As a result, the siloxanes go from the supercritical state back to the state of the supercooled liquid. The siloxanes are preferably recompressed to the initial pressure.

In a further embodiment, the siloxanes in the state of the supercritical fluid are firstly depressurized to below their critical pressure in order to generate mechanical work directly and only then are cooled in order to transfer heat to a heat consumer, e.g. secondary circular process, condensed and finally preferably recompressed to the initial pressure.

As a result of the direct depressurization and generation of additional mechanical work directly in the high-temperature heat transfer medium circular process, the secondary steam power process can be made simpler and cheaper, e.g. by reducing the pressure level, in an optimization of the pressure level.

Existing power block layouts for conventional heat transfer fluids can be employed directly for siloxanes when depressurization of the siloxanes is carried out in such a way that their temperature is afterwards 5-10° C. above the temperature of the superheated steam (e.g. 385° C.) and their condensation is concluded at 5-10° C. above the feed water preheating temperature, which is somewhat below the saturated steam temperature at the vapor pressure of the water (e.g. 120 bar).

Owing to their operating characteristics, ORC turbines can equalize load fluctuations fully automatically and more simply and more quickly than steam turbines.

The siloxanes used as HTF preferably consist of methylpolysiloxanes such as Helisol® (Wacker Chemie AG), in particular composed of linear, cyclic or branched methylpolysiloxanes or mixtures thereof.

Mixtures of short-chain and long-chain siloxanes are particularly suitable. It has been able to be shown by materials data measurements and simulations that the critical temperature of the mixture in the usable temperature range is exceeded above about 400° C. even though the long-chain siloxanes are present below their critical temperature in the usable temperature range up to 450° C. The long-chain and high-boiling siloxanes are thus obviously dissolved by the siloxanes which are already present in the supercritical state, so that an overall supercritical behavior of the mixture is obtained even though a significant proportion of siloxanes in the mixture is still significantly below its critical temperature.

When the mixtures of short-chain and long-chain siloxanes are in the state of a supercritical fluid, preference is given to at least 10% by weight, in particular at least 20% by weight, of the siloxanes being in the subcritical state.

Preferred siloxane mixtures are mixtures of methylpolysiloxanes selected from among linear compounds of the general formula I

$$Me_3SiO—(Me_2SiO)_x—SiMe_3 \quad (I),$$

and cyclic compounds of the general formula II

$$(Me_2SiO)_y, \quad (II),$$

where
Mm is a methyl radical, x has values of greater than or equal to zero and the arithmetic mean of x weighted according to the molar proportions over all linear methylpolysiloxanes is in the range from 3 to 20 and y has values greater than or equal to 3 and the arithmetic mean of y weighted according to the molar proportions over all cyclic methylpolysiloxanes is in the range from 3 to 6.

The variable x preferably takes on values in the range from zero to 100, particularly preferably from zero to 70, very particularly preferably from zero to 40. The arithmetic mean of x weighted according to the molar proportions over all linear methylpolysiloxanes is preferably in the range from 4 to 15, particularly preferably from 5 to 10, in each case inclusive of the specified limits.

The variable y preferably takes on values in the range from 3 to 100, particularly preferably from 3 to 70, very particularly preferably from 3 to 40. The arithmetic mean of y weighted according to the molar proportions over all cyclic methylpolysiloxanes is preferably in the range from 3.5 to 5.5, particularly preferably from 4 to 5, in particular from 4 to 4.5, in each case inclusive of the specified limits.

The numerical ratio of the $Me_3Si$ chain end groups in the compounds of the general formula I to the sum of $Me_2SiO$ units in the compounds of the general formulae I and II is preferably at least 1:2 and not more than 1:10.

The numerical ratio of the $Me_3Si$ chain end groups in the general formula I to the sum of $Me_2SiO$ units in the general formulae I and II is preferably at least 1:2.5 and not more than 1:8, particularly preferably at least 1:3 and not more than 1:6.

The sum of the proportions of all cyclic methylpolysiloxanes of the general formula II is preferably at least 10% by mass, particularly preferably at least 12.5% by mass, in particular at least 15% by mass, and not more than 40% by mass, particularly preferably not more than 35% by mass and in particular not more than 30% by mass.

Preference is likewise given to methylpolysiloxanes selected from among branched compounds of the general formula III

$$(Me_3SiO_{1/2})_w(SiO_{4/2})_z, \quad (III)$$

where
w is an integer from 4 to 20,
z is an integer from 1 to 15 and
Me is a methyl radical.

The units $(Me_3SiO_{1/2})_w$ are referred to as M groups and $(SiO_{4/2})_z$ are referred to as Q groups.

Preference is given to w being an integer up to 15.
Preference is given to z being an integer from 1 to 5.
Preference is given to w+z being up to 50, in particular up to 20.

Mixtures of methylpolysiloxanes in which at least 95% by weight, in particular at least 98% by weight, of the methylpolysiloxanes have z=1 and w=4 are particularly suitable for carrying out the circular process. The methylpolysiloxanes having z=1 and w=4 are also referred to as $QM_4$.

The viscosity of the HTF at 25° C. is preferably from 1 to 100 mPa*s, particularly preferably from 1 to 10 mPa*s, in each case measured using the viscometer μVISK from RheoSense Inc.

The HTF can have a monomodal, bimodal or multimodal molar mass distribution, and at the same time the molar mass distribution can be narrow or broad.

The temperatures of the HTF in the solar field in day operation are preferably up to 490° C., in particular from 150° C. to 475° C., particularly preferably from 250° C. to 450° C.

The pressure in the HTF circular process is preferably up to 1-50 bar, in particular from 15 to 40 bar, particularly preferably from 16 to 35 bar.

OVERVIEW OF THE DRAWINGS

FIG. 1: Generalized heat transfer medium circular process according to the prior art.

Figure 1A:
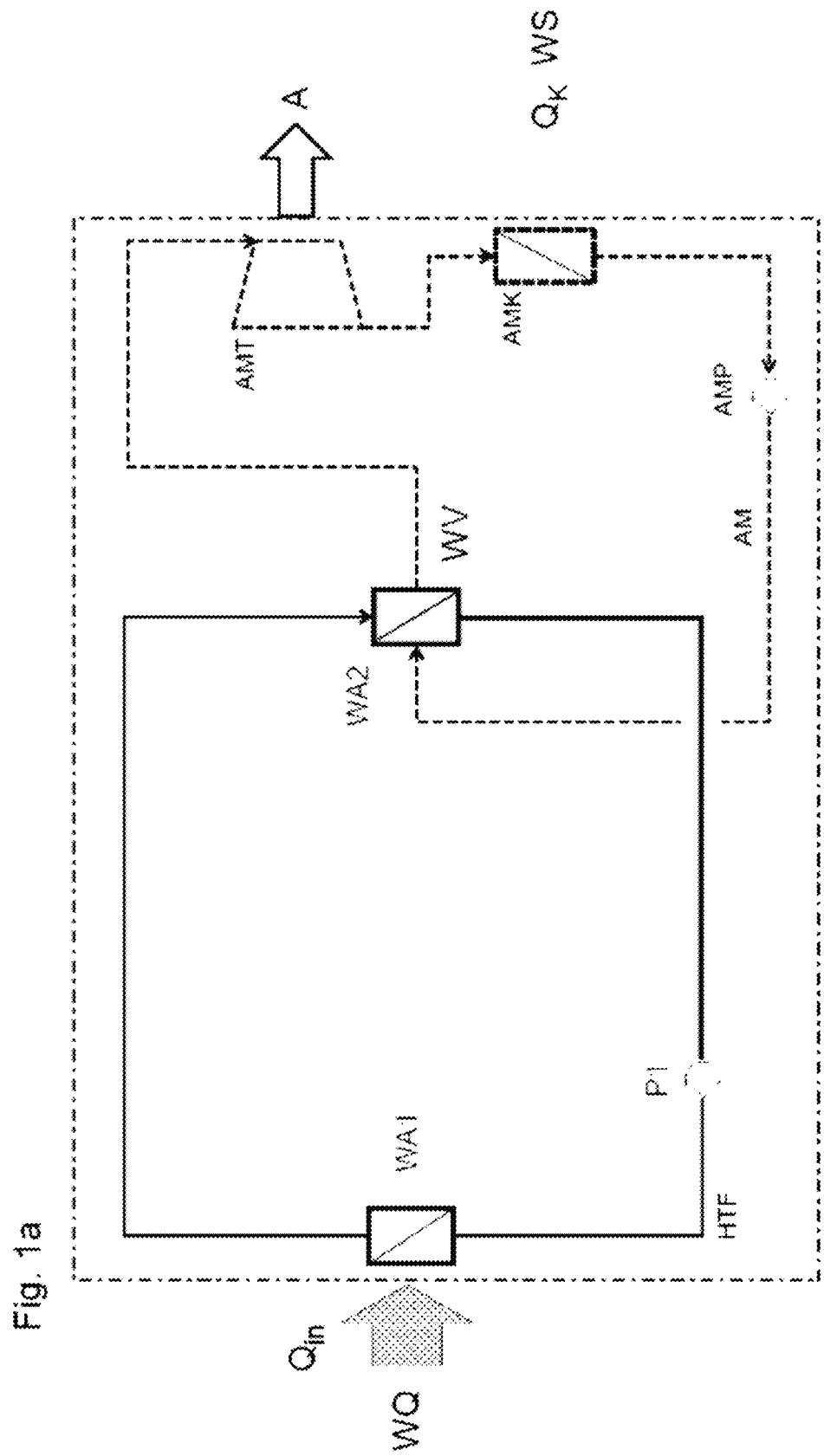

FIG. 1*a*: A primary heat transfer medium circular process is coupled to a secondary circular process for obtaining mechanical work (A).

Figure 1B:
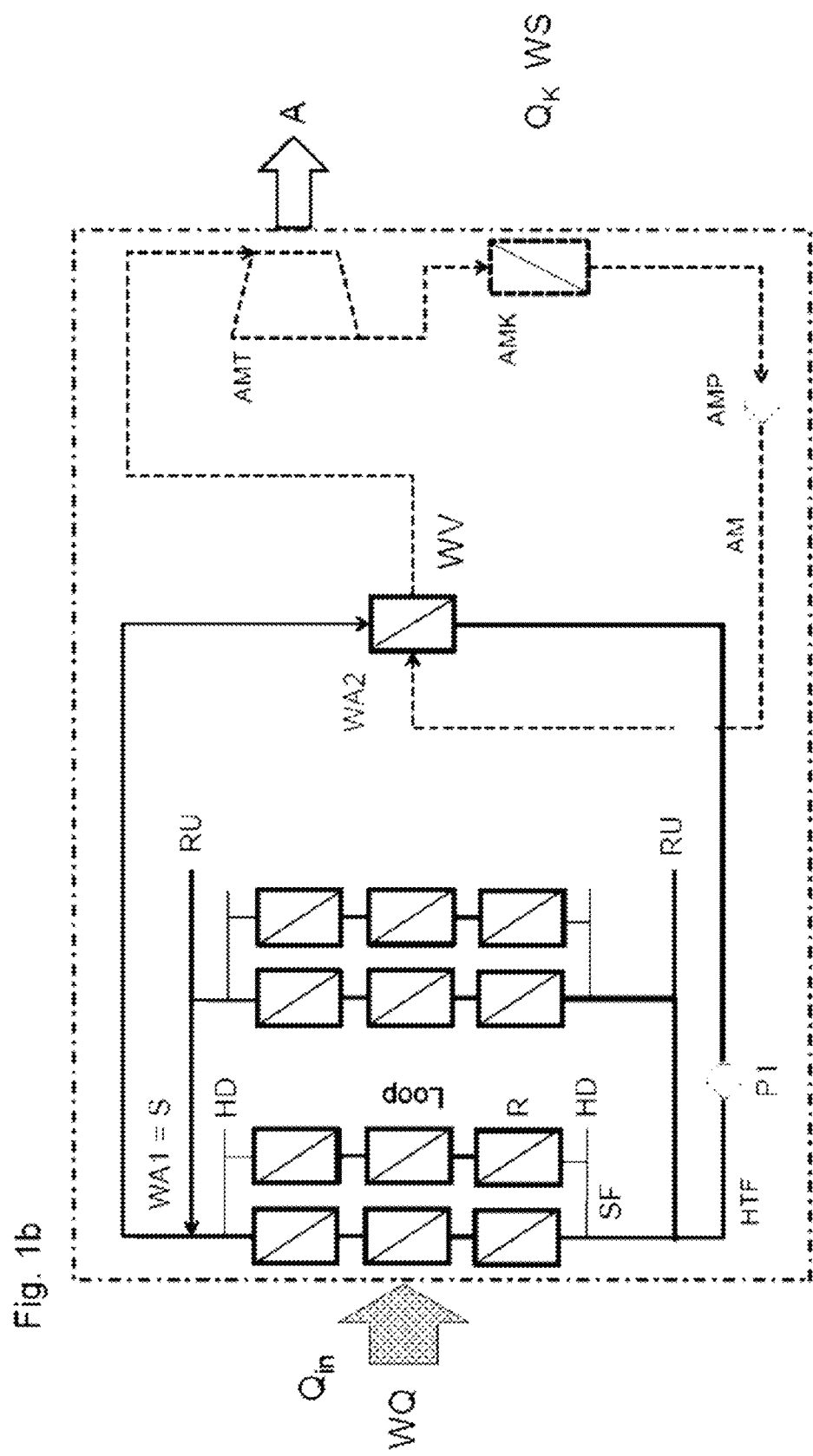

FIG. 1*b*: A CSP power station is operating using heat transfer fluid (HTF), where a primary heat transfer medium circular process is coupled to a second circular process for obtaining mechanical work (A).

Figure 2:
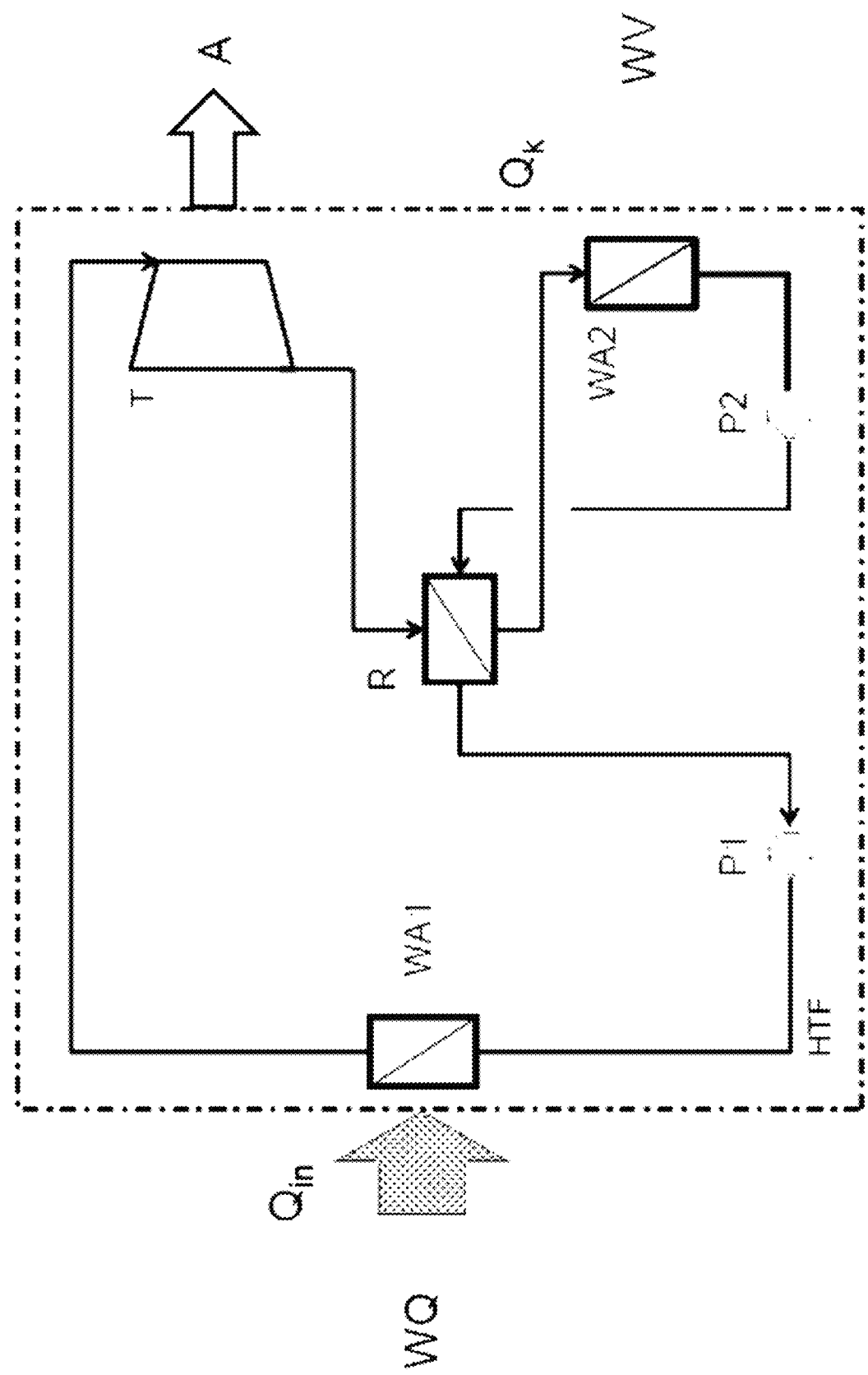

FIG. 2: A heat transfer fluid is heated to above its critical temperature and depressurized as supercritical fluid to a pressure below its critical pressure in order to provide mechanical work before it transfers heat to a heat consumer.

Figure 2A:
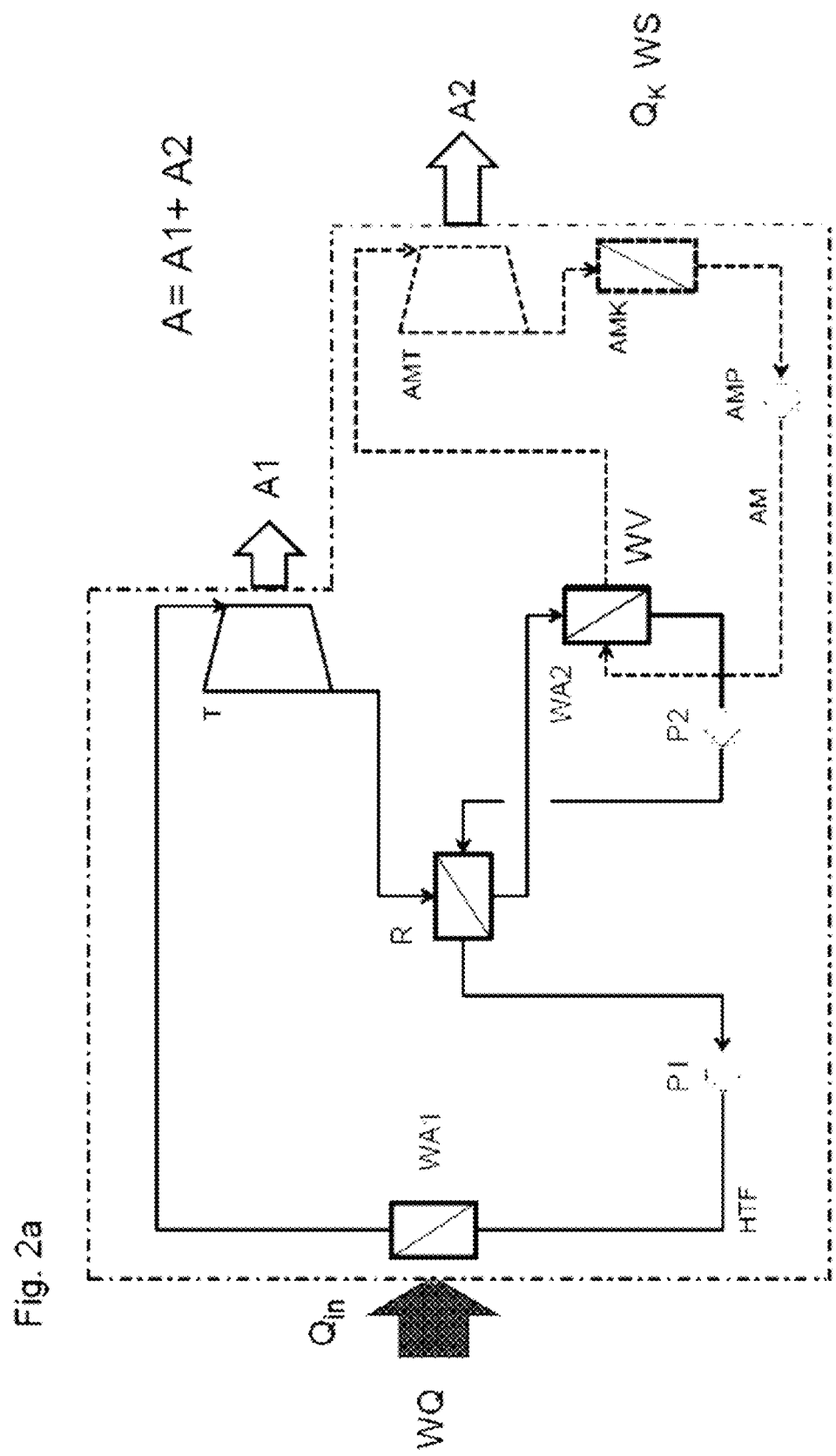

FIG. 2*a*: A CSP power station is operating using a heat transfer fluid, where heat transfer fluid is heated to above its critical temperature and then depressurized as supercritical fluid to a pressure below its critical pressure to provide mechanical work before it transfers heat to a heat consumer.

FIG. 3.1: Heating of HELISOL® 5A only to below the critical point, transfer of heat without work being provided, according to the prior art.

FIG. 3.2: Heating of HELISOL® 5A to above the critical point, transfer of heat without work being provided.

FIG. 3.3: Heating of HELISOL® 5A to above the critical point, depressurization with work being provided before transfer of heat.

FIG. 3.4: Heating of QM4 to above the critical point, transfer of heat without work being provided.

FIG. 3.5: Heating of QM4 to above the critical point, depressurization with provision of work before transfer of heat.

DETAILED DESCRIPTION OF PREFERRED EMBODIMENTS

In the following examples, all amounts and percentages are by weight, all pressures are 0.10 MPa (abs.) and all temperatures are 20° C. unless indicated otherwise in the particular case.

EXAMPLES

Example 1

Demonstrates the prior art: The heat transfer fluid is heated above its vapor pressure only to below its critical temperature, i.e. is always present as liquid.

In a generalized heat transfer medium circular process according to the prior art (FIG. 1), a quantity of heat (Qin) is transferred from a heat source (WQ) to a high-temperature heat transfer fluid (HTF) in a heat exchanger (WA1) and transferred again (Qk) to a heat consumer (WV) in the heat exchanger (WA2). The heat transfer fluid according to the prior art is a liquid at a pressure above its vapor pressure and transfers a heat stream from a heat source having a relatively high temperature to a heat consumer at a lower temperature without providing mechanical work. The heat transfer medium pump (P1) is necessary to overcome the pressure drop in the heat transfer medium circular process.

A primary heat transfer medium circular process is frequently coupled to a secondary circular process for obtaining mechanical work (A) (FIG. 1*a*). The heat consumer (WV) is in this case the secondary circular process which is operated using a working medium (AM).

The working medium is vaporized on the secondary side of the heat exchanger (WA2) by uptake of heat from the primary heat transfer medium circular process at high pressure in order to generate mechanical work (A) on depressurization to a low pressure in the turbine (AMT). The working medium is then condensed in the condenser (AMK) and recompressed by means of a feed water pump (AMP) to the high pressure for the vaporization step. The pressure to which the working medium can be depressurized in the turbine (AMT) corresponds to the vapor pressure of the working medium (AM) at the condensation temperature in the condenser (AMK), which has to be greater than the temperature of the heat sink (WS) available at the location in order to be able to take up the heat of condensation (Qk).

In the specific case of a solar-thermal power station (CSP), the heat source (WQ) is the Sun (FIG. 1*b*). The radiative heat (Qin) is transferred to the heat transfer fluid (HTF) in the solar field (S). The solar field (S) is a particular embodiment of a heat exchanger (WA1) and generally consists of a plurality of subfields (SF) which each consist of a plurality of parallel loops with receivers (R) connected in series. The distribution/collection conduits for the loops are referred to as headers (HD), and the connecting conduits between the subfields and main conduits are referred to as runners (RJ).

In the specific example 1, a CSP power station (FIG. 1*b*) is operated using the heat transfer fluid (HTF) HELISOL® 5A, with the heat transfer fluid being heated from 295° C. to 395° C., only to below its critical temperature, and thus being, according to the prior art, present as liquid in the entire primary heat transfer medium circular process.

HELISOL® 5A is a mixture of linear methylpolysiloxanes of the general formula I and cyclic compounds of the general formula II.

At a maximum operating temperature up to 400° C., the critical temperature of HELISOL® 5A is in the range $p_{crit}$=13 to 14 bar and the critical temperature is in the range $T_{crit}$=415 to 430° C.

In the secondary circular process, water (AM) is vaporized at 120 bar and superheated to 385° C. (10° C. temperature difference from the primary heat transfer medium temperature).

The condensation temperature is 50° C. (heat sink (WS) is ambient air; no cooling water is available at the location). For an ideal Carnot cycle process, a theoretical thermal efficiency $\eta_{th}<1-T_{condensation}$ [K]/$T_{steam}$ [K]<50.9% is the limiting case, but this is unattainable in practice.

In the case of a steam turbine having an isentropic efficiency of 92%, a real thermal efficiency of the secondary circular process (turbine power-pump power)/introduced thermal energy) of 34.8% is obtained.

In practice, a complicated multistage, at least two-stage, arrangement with intermediate superheating is necessary for the steam turbine, since in the case of a single-stage depressurization the steam would become too wet (this also applies to the following examples).

4.7% of the heat (Qin) taken up in the solar field is consumed to provide the driving power for the pump (P1) in the primary heat transfer medium circular process; here, the real thermal efficiency of the secondary circular process for generating mechanical work is taken into account.

In the case of a CSP power station having an effective work power of 50 MW, a thermal power of 150.8 MW consequently has to be provided in the heat exchanger (WA2), plus heat losses.

The primary heat transfer medium circular process is shown in the TP diagram in FIG. 3.1:

Heat uptake in the solar receiver loops (1), pressure drop in the collection tube conduits (headers and runners) (2), heat transfer in the heat exchanger (WA2) to the secondary steam turbine circular process (3), increase of pressure in the heat transfer medium pump (P1) (4) and pressure drop in the distributor tube conduits (runners and headers) (5).

The transfer of 1 MW of thermal power requires 17.2 t/h of HELISOL® 5A, and the enthalpy difference is 209 KJ/kg.

Example 2

The heat transfer fluid is, according to the invention, heated to above its critical temperature and is then present as supercritical fluid, mechanical work is not provided.

A CSP power station (FIG. 1b) is operating using the high-temperature heat transfer fluid (HTF) HELISOL® 5A, with the heat transfer fluid being heated from 300° C. to 425° C., to above its critical temperature. At a maximum operating temperature of 425° C., the critical pressure of HELISOL® 5A is pcrit=15 to 16 bar and the critical temperature is Tcrit=400 to 410° C. The change in the critical point is caused by the temperature-dependent establishment of chemical equilibrium.

The entire heat transfer medium circular process takes place above the critical pressure. When heat is taken up in the solar field, a continual change in state from the supercooled liquid to the high-density supercritical fluid occurs without a noticeable phase transition.

The supercritical fluid nevertheless behaves like a real gas, i.e. it occupies all the volume available, it is compressible and the density is a function of pressure and temperature, and a "vapor pressure" is nonexistent.

When it is transferred to a heat consumer (WV) in the heat exchanger (WA2), a change in state of the supercritical fluid back to supercooled liquid takes place. Mechanical work is not provided here, and the pressure drop has to be applied by means of the heat transfer medium pump (P1).

The heat consumer (WV) is a thermal steam power station as in Example 1.

At the maximum temperature of 425° C. in the primary HTF circuit, a steam temperature of 415° C. can be realized in the secondary circular process.

The condensation temperature is 50° C. (heat sink=ambient air, no cooling water available at the location). For an ideal Carnot cycle process, a theoretical thermal efficiency $\eta_{th} < 1 - T_{condensation}$ [K]/$T_{steam}$ [K]<53.0% is obtained as a limiting value, but this is not attainable in practice.

In the case of a steam turbine having an isentropic efficiency of 92%, a real thermal efficiency of the secondary circular process (turbine power-pump power)/introduced thermal energy) of 35.2% is obtained (+0.4% compared to Example 1).

Only about 2.6% of the heat taken up in the solar field is consumed for providing the driving power for the pump P1 in the primary heat transfer medium circular process.

In the case of a CSP power station having an effective work power of 50 MW, a thermal power of only 145.8 MW consequently has to be provided now (−3.3% compared to Example 1), plus heat losses.

The primary heat transfer medium circular process is shown for a specific case in the TP diagram in FIG. 3.2.

Only 12.9 t/h of HELISOL® 5A are now required for transferring 1 MW of thermal power; the enthalpy difference is 280 KJ/kg.

Example 3

The heat transfer fluid is heated to above its critical temperature according to the invention and then depressurized as supercritical fluid to a pressure below its critical pressure to provide mechanical work, before it transfers heat to a heat consumer (FIG. 2)

A CSP power station (FIG. 2a, solar field shown in simplified form as heat exchanger WA1) is operated using the heat transfer fluid (HTF) HELISOL® 5A, with the heat transfer fluid being, as in Example 2, heated in the solar receiver loops firstly to 425° C., namely above its critical temperature (1). The pressure is reduced in the collection tube conduits (headers and runners) due to the pressure drop (2). The heat transfer fluid is then firstly depressurized, without a phase transition, in an ORC turbine (T) to a pressure below its critical pressure, see FIG. 3.3 (3), providing the mechanical work (A1). Internal heat exchange takes place in the recuperator (4,7) in order to set the entry temperature into the solar field.

The depressurization from the supercritical region to the region of the superheated saturated gas occurs without a phase transition since the two-phase region is only touched tangentially. This is an in-principle advantage over a steam turbine, which can advantageously be utilized for automatic load regulation. In the case of a steam turbine, superheating always has to be adhered to exactly so that the steam does not become too wet on depressurization.

Heat is then transferred to a secondary steam turbine circular process (5), resulting in the heat transfer fluid condensing. The pressure of the condensed heat transfer liquid is increased by means of the ORC pump (6) and HTF pump (8) in the example.

The increasing of the pressure can also be carried out in a single stage.

After the pressure drop in the conduits (runners and headers) (9), the heat transfer fluid is again present as supercooled liquid in order to take up heat again (1) in the receiver loops.

In contrast to Example 2, the HTF entry temperature into the ORC turbine (T) is 10° C. higher than the entry temperature of the working medium (AM) into the turbine (AMT) in the secondary circular process.

For an ideal Carnot cycle process, a theoretical thermal efficiency $\eta_{th} < 1 - T_{condensation}$ [K]/$T_{steam}$ [K]<53.7%, which is 0.7% higher than in Example 2, is therefore obtained as limiting value for Example 3, but this is not attainable in practice.

The primary heat transfer medium circular process is shown in the TP diagram in FIG. 3.3.

The amount of HELISOL® 5A for transferring the thermal power in the solar field and the enthalpy difference is identical to that in Example 2.

Only 2.6% of the heat taken up in the solar field is consumed for providing the driving power for the pump P1 in the primary heat transfer medium circular process, which is identical to Example 2.

However, HELISOL® 5A provides as much as 6.63 kJ/kg of useful mechanical work (A1) on depressurization from 17.7 to 7 bar in an ORC turbine (isentropic efficiency 92%).

In summary, an overall thermal efficiency (turbine powers (A1+A2)−pump powers (AMP+P2))/introduced thermal power of 35.8% (+0.6% compared to Example 2) is obtained in Example 3.

The same amount of HELISOL® 5A has to be pumped through the solar field in order to take up 1 MW of thermal power.

However, owing to the better overall efficiency, a thermal power of only 143.3 MW (−5.0% compared to Example 1), plus heat losses, has to be provided for a CSP power station having the effective work power of 50 MW.

Example 4

In Example 4, WACKER QM4 is used as HTF instead of WACKER HELISOL® 5A.

QM4 is a siloxane-based one-component system which has its critical point at about 350° C. and 8 bar.

QM4 is the compound of the general formula III in which z=1 and w=4.

According to the prior art, this heat transfer fluid would not be usable in the high-temperature range of >350° C.

However, according to the invention QM4 is, like HELISOL® 5A, usable as HTF fluid in the temperature range up to 425° C.

The primary heat transfer medium circular process using QM4 without work being provided is shown in the TP diagram in FIG. 3.4 for the same application in a CSP power station corresponding to Example 2 using HELISOL® 5A (for comparison, see FIG. 3.3).

Compared to HELISOL® 5A, QM4 as one-component system has a vapor pressure curve in the TP diagram which ends at the critical point, while HELISOL® 5A as multi-component system has a two-phase region with boiling curve and condensation curve, the two of which join and end at the critical point of the mixture, in the TP diagram.

In the case of QM4, the supercritical region is significantly more pronounced than in the case of HELISOL® 5A.

13.12 t/h of QM4 are required for the transfer of 1 MW of thermal power; the enthalpy difference is 274 kJ/kg.

The thermal efficiency of the secondary circular process is 35.2% and is identical to that in Example 2.

3.2% (rather than 2.6% in Example 2) of the heat taken up in the solar field is consumed for providing the driving power for the pump P1 in the primary heat transfer medium circular process.

In the case of a CSP power station having an effective work power of 50 MW, a thermal power of 146.7 MW has to be provided (+0.6% compared to Example 2), plus heat losses.

Example 5

The primary heat transfer medium circular process using QM4 with provision of work is shown in the TP diagram in FIG. 3.5 for the same application in a CSP power station corresponding to that of Example 3 using HELISOL® 5A (see FIG. 3.3).

The overall primary heat transfer medium circular process now takes place around the critical point which is effectively in the center.

In Example 5, the ORC turbine assumes 6.5% of the effective total work power, while in Example 3 it contributes only 4.3% to the effective total work power.

The overall thermal efficiency in Example 5 is 36.3% and is thus 0.5% higher than in Example 3 using HELISOL® 5A.

A thermal power of only 142.2 MW therefore has to be provided from the solar field (−5.8% compared to reference example 1 according to the prior art) for a CSP power station having an effective work power of 50 MW.

The invention claimed is:

1. A circular process of heat transfer employing siloxanes as a high-temperature heat transfer fluid (HTF), comprising:
    transitioning the siloxanes from a state of a supercooled liquid into a state of a high-density supercritical fluid due to heat uptake, and
    transferring energy to an energy consumer without a phase transition of the siloxanes.

2. The circular process of claim 1, wherein the siloxanes are cooled in the state of the supercritical liquid and in the cooling process transfer heat to an energy consumer.

3. The circular process of claim 1, wherein the siloxanes in the state of the supercritical liquid are firstly depressurized to below their critical pressure in order to generate mechanical work directly and only then are cooled and condensed in order to transfer heat to an energy consumer.

4. The circular process of claim 1, wherein the siloxanes used as the HTF comprise methylpolysiloxanes.

5. The circular process of claim 4, wherein the siloxanes used as the HTF are mixtures of linear methylpolysiloxanes of the formula I $$Me_3SiO\text{—}(Me_2SiO)_x\text{—}SiMe_3 \quad (I),$$

and cyclic compounds of the formula II $$(Me_2SiO)_y \quad (II),$$

Where

Me is a methyl radical, x has values of greater than or equal to zero and the arithmetic mean of x weighted according to the molar proportions over all linear methylpolysiloxanes is in the range of from 3 to 20 and y has values greater than or equal to 3 and the arithmetic mean of y weighted according to the molar proportions over all cyclic methylpolysiloxanes is in the range of from 3 to 6.

6. The circular process of claim 1, wherein the siloxanes used as the HTF are branched compounds of the formula III $$(Me_3SiO_{1/2})_w(SiO_{4/2})_z \quad (III)$$

Where w is an integer from 4 to 20, z is an integer from 1 to 15 and

Me is a methyl radical.

* * * * *